Jan. 10, 1950 H. A. HUMPAGE Re. 23,188

CIRCUIT BREAKER

Original Filed May 24, 1945 2 Sheets-Sheet 1

INVENTOR.
HAROLD ALBERT HUMPAGE
BY Edwin Leisohn
ATTORNEY.

Jan. 10, 1950 H. A. HUMPAGE Re. 23,188

CIRCUIT BREAKER

Original Filed May 24, 1945 2 Sheets-Sheet 2

INVENTOR.
HAROLD ALBERT HUMPAGE
BY Edwin Lerisohn
ATTORNEY.

Reissued Jan. 10, 1950

Re. 23,188

UNITED STATES PATENT OFFICE 23,188

CIRCUIT BREAKER

Harold Albert Humpage, Bloomfield, N. J., assignor, by mesne assignments, to Federal Electric Products Company, Newark, N. J., a corporation Original No. 2,459,427, dated January 18, 1949, Serial No. 595,556, May 24, 1945. Application for reissue June 17, 1949, Serial No. 99,813

9 Claims. (Cl. 200—88)

Matter enclosed in heavy brackets [ ] appears in the original patent but forms no part of this reissue specification; matter printed in italics indicates the additions made by reissue

This invention relates to automatic circuit breakers, and more particularly to circuit breakers of the type which are used for house lighting and other low amperage circuits.

It is an object of the invention to provide a circuit breaker constructed and arranged to be opened under the control of a thermal current responsive member, such as a bi-metallic thermostatic strip, and also under the control of electro magnetic means directly associated with said bi-metallic element and operable to deflect the latter for effecting disengagement of the movable contact from the stationary contact of the circuit breaker.

A further object of the invention is generally to provide an improved small and inexpensive circuit breaker which is well adapted to be used, with reliability of operation, for houselighting and other low amperage circuits in lieu of a switch and fuse combination.

The above and other objects, features and advantages of the present invention will be fully understood from the following description considered in connection with the accompanying illustrative drawings.

Figure 1:
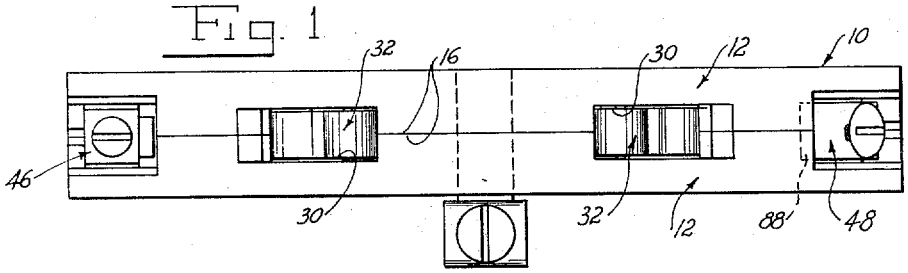
Fig. 1 is a front view of a circuit breaker embodying the present invention.
Figure 2:
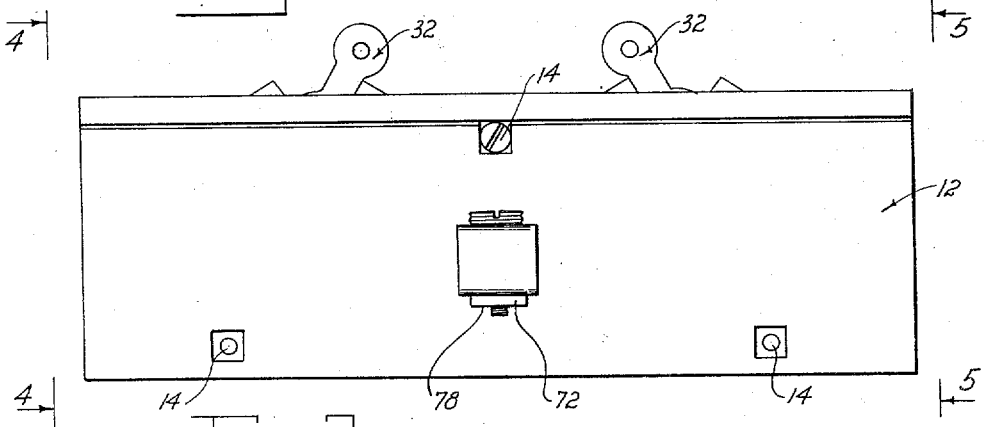
Fig. 2 is a side view thereof.
Figure 3:
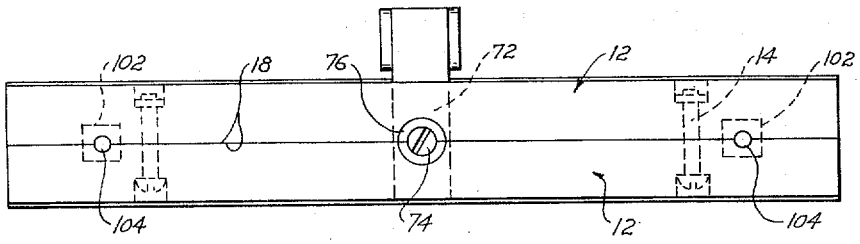
Fig. 3 is a rear view thereof.
Figure 4:
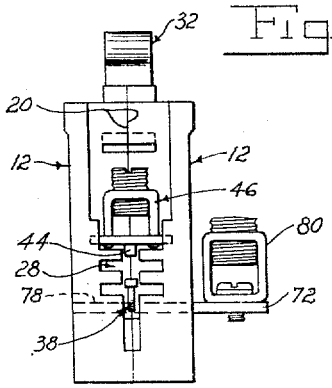
Figure 5:
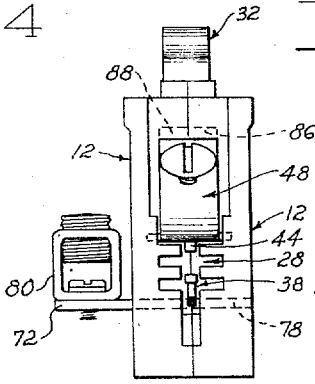
Figure 6:
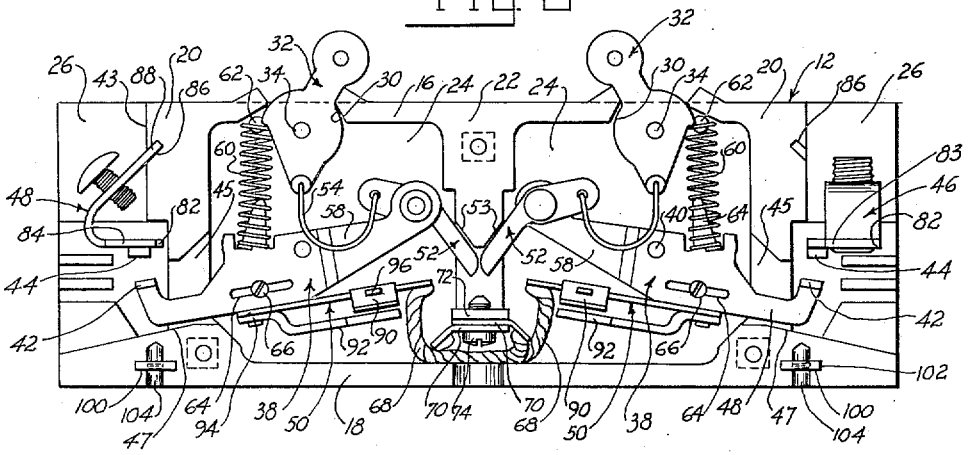
Figure 7:
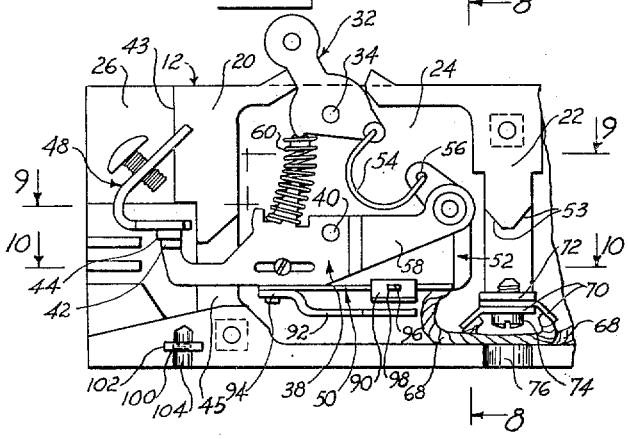
Figure 8:
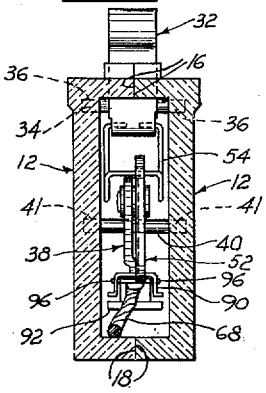
Figure 9:
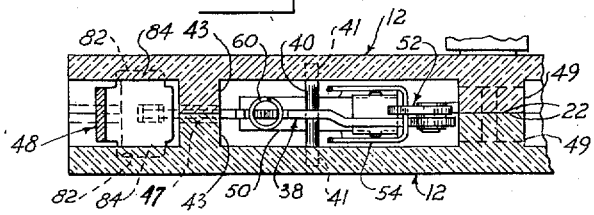
Figure 10:
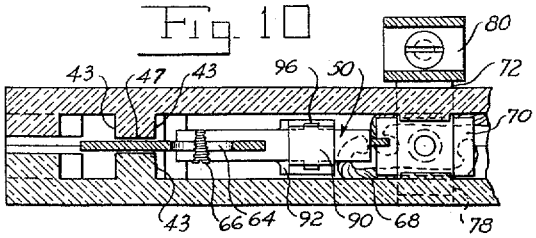
Figure 11:
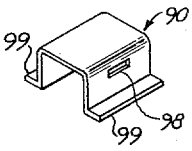
Figure 12:
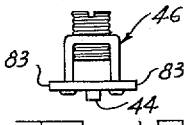
Figure 13:
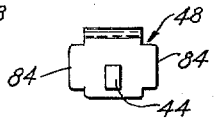

Figs. 4 and 5 are end views as seen from lines 4—4 and 5—5 respectively of Fig. 2;

Fig. 6 is a side view of the circuit breaker, one part of the housing being removed, the movable contact members of the circuit breaker mechanisms being in their open positions;

Fig. 7 is a view of the left hand part of the housing, as illustrated in Fig. 6, and of the circuit breaker mechanism, showing the movable contact member in its closed position;

Fig. 8 is a sectional view on the line 8—8 of Fig. 7;

Fig. 9 is a sectional view on the line 9—9 of Fig. 7;

Fig. 10 is a sectional view on line 10—10 of Fig. 7;

Fig. 11 is a perspective view of a magnetic member forming a part of a circuit breaker mechanism;

Fig. 12 is an end view of a combined terminal and stationary contact member of one type;

Fig. 13 is a bottom view of a combined terminal and stationary contact member of another type.

Referring now to the drawings in detail, the circuit breaker of the present invention comprises a two part insulation casing or housing 10 formed of two identical or symmetrical parts 12, each of said parts being formed of insulation material preferably by a molding operation. Each casing part 12 forms one-half of the housing, the two casing parts being secured in housing defining relation in any suitable way, for example by bolts 14, the front and rear facing edges 16 and 18, the end facing edge 20 and the intermediate facing edge 22 of the two casing parts 12 being in abutting surface to surface relation. Said facing edges are formed on the thickened edge portions at the inner or confronting sides of the opposed side walls of the housing, said thickened edge portions of said side walls extending peripherally of the housing. Thus, each casing part is formed with two recesses 24 which define two chambers for two circuit breaker mechanisms. It will be understood, however, that the housing can be provided for a single pole breaker in which case it can have a single chamber, in lieu of the two chambers for the multi-pole circuit breaker illustrated herein. Each casing part 12 is provided at its opposite ends with open recessed portions 26 which form arcing chambers and in which terminal members and the stationary contacts of the two circuit breaker units are positioned respectively. The arcing chambers formed by the recesses 26 provided in the companion casing parts 12 are indicated at 28 in Figs. 4 and 5. The front of each casing part is provided with recessed portions which define openings 30 through which the handles 32 project for manual operation of the circuit breaker mechanisms. Each of said handles is fixed to pivot pin 34, the opposite ends of which are received in bearing recesses 36 (Fig. 8) formed in the companion casing parts 12.

Referring now to the circuit breaker mechanisms, which are disposed in the companion chambers in housing 10, each of said mechanisms is of the same construction and includes a manually operable member, here shown as the above-mentioned pivoted handle 32. A movable contact member 38, formed in one piece of sheet metal of suitable thickness, is mounted in the chamber for pivotal movement by pivot pin 40, the opposite ends of which are received in aligned bearing recesses 41 in the companion casing parts 12. Said movable contact member 38 is provided at one end thereof with a contact 42 which is engageable with and disengageable from a companion stationary contact 44 carried by a terminal member 46 or by a terminal member 48 both of which will hereinafter be more particularly described. The casing 10 is provided with means for guiding movable contact member 38, for which purpose the thickened or inwardly projecting end portions 43 of the companion casing parts 12 are provided with recessed portions 45 which define a guide slot 47 (Figs. 9 and 10) through which an end portion 48 projects with slight clearance. Thus, it will be noted that the means for guiding the movable contact member 38 of each circuit breaker mechanism is formed in the casing as integral parts thereof. A thermal-current responsive member 50 which, as here shown, consists of a thermostatic bi-metallic flexible strip, is welded or otherwise secured at one end thereof to a side edge of movable contact member 38. The free end of bi-metallic strip 50 is arranged to releasably engage the end of one arm of a *latching* lever 52 pivotally mounted on the end of movable contact member 38 opposite to the end which carries the contact 42, said lever 52 being preferably insulated from the movable contact member in any suitable way, for example, as shown in Fig. 7 of Christensen Patent No. 2,209,319. The other arm of lever 52 is connected to the companion handle 32 by a resilient link 54, one end of which passes with slight clearance through an opening 56 in said arm and the other end of which is pivotally engaged with the adjacent end of said handle. As clearly shown in the drawings, each movable contact member 38 is provided with a laterally offset portion 58 so that each circuit breaker mechanism can comprise a movable contact member of the same construction as well as other parts of the same construction and be mounted interchangeably in either of the mechanism chambers of the casing. A coil spring 60 is operatively interposed between the movable contact member 38 and the companion handle 32 for biasing the movable contact member to its open position. One end of said spring engages a lug 62 fixed to handle 32 and the other end of said spring engages a lug 64 integral with the companion movable contact member 38. The mechanism constituted by handle 32 movable contact member 38 thermal strip 50 lever 52 and link 54 is similar to and operates substantially in the same way as corresponding mechanism in the circuit breaker disclosed in said Christensen Patent No. 2,209,319. Also as here shown the movable contact member 38 is provided with a slot 64 and a tapered screw 66 for calibrating the circuit breaker as shown and described in said Christensen patent. It will be understood that member 50 operates to latch the manually operable actuating mechanism to the movable contact member and to unlatch the actuating mechanism from the movable contact member, the unlatching taking place by deflection of member 50 from engagement with lever 52 upon the occurrence of an overload or under other abnormal predetermined current conditions in the circuit controlled by the circuit breaker. When member 50 is deflected from engagement with the companion *latching* lever 52, spring 60 is effective to move contact member 38 to its open position, i. e., from the position illustrated in Fig. 7 to the position illustrated in Fig. 6. It will be noted that the inner end of the guide slot 47 constitutes a stop for member 38 to limit the opening movement of the latter. The intermediate thickened wall portion 49 of each casing part 12 terminates short of the rear wall of the casing to provide a recess into which levers 52 are movable, as shown in Fig. 6, and to provide shoulders 53 which serve as stops for said levers, respectively.

The thermal element 50 is connected in series with movable contact member 38 and the circuit which is to be controlled by the circuit breaker. For this purpose a flexible metallic conductor or connector 68 is connected to said thermal element, preferably adjacent to free end thereof, and to a companion terminal member 70. There are two terminal members 70, one for each of the two thermal members 50 of the two circuit breaker mechanisms. These two terminal members 70 are positioned in the recess below intermediate casing portions 49, and are mechanically and electrically connected preferably removably, to a common lead or bus bar 72 in any suitable way as by a screw 74 which passes through aligned apertures in said thermal member 70 and is threaded into a tapped hole in bus bar 72. An opening 76 is provided in the back of casing 10 for access to screw 74. The lead or bus bar 72 enters the casing through a slot 78 in the side thereof. Said slot is provided in each of the companion casing parts 12. Thus, the terminal lead or bus bar 72 can be long enough to project into a plurality of casings 10 which may be disposed with their respective side walls in adjacent or abutting side by side relation. The outer portion of bus bar 72 is provided with a terminal member 80. It will be noted that the provision of the separate individual terminals 70 for the two circuit breaker mechanisms provides for independent calibration and testing of the different circuit breaker mechanisms and also provides for different current carrying capacities of the two circuit breaker mechanisms, respectively. Thus, while the two circuit breaker mechanisms are mounted in a common housing, they can be of different current carrying capacities or ratings, although, of course, they can have the same current carrying capacities or ratings. As here shown, the circuit breaker mechanisms are illustrated for different current carrying capacities as indicated by the different terminal members 46 and 48 for the two independently operable circuit breaker mechanisms, respectively. More particularly the circuit breaker mechanism at the right of the casing, as illustrated in Fig. 6 is designed for a higher current carrying capacity than the other circuit breaker mechanism and for that purpose the terminal member 46 of said first mentioned circuit breaker mechanism has a higher current carrying capacity than the terminal member 48 for the other circuit breaker mechanism. Also it will be noted that the terminal members 70 when secured to the bus bar 72 internally of the housing hold the latter in stationary position, since said terminal members are positioned in the space between confronting wall portions of the housing with the edges of said terminal members abutting or closely adjacent to the inner surfaces of said adjacent portions, respectively, of the housing.

The casing 10 is constructed to hold the terminal members 46 and 48 in such manner as to obviate the need for screws or other fastening means. For this purpose the casing 10 is provided with aligned recesses 82 formed in the companion casing parts 12 to receive either the projections 83 of the terminal member 46 or the projections 84 of the terminal member 48. In addition to the recesses 82, casing 10 is provided at each end thereof with aligned recess 86 formed in the two casing parts 12 to receive an end portion 88 of thermal member 48. It will be noted therefore, that the casing is constructed and arranged so that either terminals such as 46 or terminals such as 48 can be mounted and secured at both ends of the casing, or as here shown, a terminal such as 46 can be mounted and secured at one end of the casing and a terminal such as 48 can be mounted and secured at the opposite end of the casing. It will be understood that when the terminals are positioned with their projecting portions 83 or 84, as the case may be, in the companion recesses 82 and the two casing parts are fastened together by the bolts 14, or in any other suitable manner, with their inner faces in abutting relation, the terminal members are securely held or fastened to the casing, in position between the opposite side walls thereof, thus eliminating the use of extraneous fastening devices. It will be noted that, as here shown, members 46 and 48 carry the stationary contacts 44, which are preferably welded thereto, and thus constitute combined terminal and stationary contact members, and that when said combined members are mounted on the casing said stationary contacts are disposed in the respective arcing chambers in position to be releasably engaged by the contacts 42 of the companion movable contact members 38, respectively.

The thermal current responsive member 50 is operable not only in response to the heating effect of the current passing therethrough, but is also operable under the control of electro magnetic means for effecting disengagement of the companion relatively movable contacts 42 and 44, and the arrangement is preferably such that as here shown the electro magnetic means is energized by the current which passes through the thermal current responsive member 50. For this purpose an electro magnetic member 90 is mounted on member 50 near the free end thereof and a companion rigid armature 92 is disposed in spaced confronting relation to electro magnetic member 90. As clearly illustrated in the drawings, the inner end 94 of armature 92 is fixed, preferably by welding, to the fixed end of thermal member 50. The electro magnetic member 90 is secured to the thermal member 50 by lateral projections 96 which are integral with thermal member 50 and which project through openings 98 in the companion electro magnetic member 90. Preferably, openings 98 are somewhat larger than the companion provisions 96 to allow relative movement between thermal member 50 and electro magnetic member 90 so as to maintain the parallel relation between the confronting portions of member 90 and the companion armature 92 without impairment by the deflection or flexing of thermal member 50. As shown in the drawings, magnetic member 90 straddles the member 50 by which it is carried. Said member 90 is formed in one piece of soft sheet steel or other suitable sheet metal and is provided with an end wall, opposed side walls in which the openings 98 are provided, and with out-turned end portions 99 (Fig. 11) which are arranged in surface-confronting relation to the adjacent surface of armature 92.

Openings 98 are positioned so that said end wall of member 90 is spaced from member 50, and there is a slight clearance between the edges of member 50 and the inner surfaces of the side walls of member 90 so that the latter has a free relative movement on member 50. It will be understood that upon the occurrence of an overload in excess of that for which the circuit breaker is designed to open under the control of the thermal member 50 by flexing of the latter in response to the heating thereof, the electro magnetic device is operable instantaneously to effect, disengagement of the companion contact members. It will be understood that upon the occurrence of such excess overload the magnetic attraction between members 90 and 92 results in the deflection of thermal strip 50 for disengaging the latter from the companion arm of the lever 52, and in this connection it will be understood that since member 92 is rigid and thermal member 50 which carried member 90 is flexible, member 90 is movable by magnetic attraction toward member 92, thus deflecting or unlatching thermal member 50 from the companion lever 52.

The housing 10 is provided with means to enable it to be secured to a supporting plate, panel, or other support. For this purpose the casing parts 12 are provided with recesses 100 in which nuts 102 fit and are held against rotation by the side walls of the recesses. Holes 104 are provided at the back of the housing for screws (not shown) which engage nuts 102.

Certain features shown but not claimed herein are claimed in my divisional application Ser. No. 41,837, filed July 31, 1948.

While I have shown and described the preferred embodiment of my invention, it will be understood that the latter may be embodied otherwise that as herein specifically illustrated or described and that in the illustrated embodiment certain changes in the details of construction and in the arrangement of parts may be made without departing from the underlying idea or principles of the invention within the scope of the appended claims.

Having thus described my invention, what I claim and desire to secure by Letters Patent, is:

[1. In an automatic circuit breaker which comprises a stationary contact, a movable contact member provided with a contact engageable with and disengageable from said stationary contact, manually operable actuating means, and a thermally responsive bi-metallic strip for effecting disengagement of said contact in response to predetermined current in the circuit, said strip being carried by and bodily movable with said movable contact member and also movable relatively thereto for latching the latter to and unlatching it from said actuating means, the combination with said movable contact member and said strip of an electro-magnet carried by said strip and a companion armature carried by said movable contact member, said electro-magnet being movable in relation to said armature in response to predetermined current in the circuit whereby to move said strip to unlatch said movable contact member from said actuating means independently of the response of said strip itself to the current, and means operable upon the unlatching of said movable contact member to move the latter to disengage said contact thereof from said stationary contact.]

[2. In an automatic circuit breaker which comprises a stationary contact, a movable contact member provided with a contact engageable with and disengageable from said stationary contact, manually operable actuating means, and a thermally-responsive bi-metallic strip for effecting disengagement of said contact in response to predetermined current in the circuit, said strip being carried by and bodily movable with said movable contact member and also movable relatively thereto for latching the latter to and unlatching it from said actuating means, the combination with said movable contact member and said strip of an electro-magnet carried by said strip and a companion armature carried by said movable contact member, said electro-magnet being movable in relation to said armature in response to predetermined current in the circuit whereby to move said strip to unlatch said movable contact member from said actuating means independently of the response of said strip itself to the current, said strip being electrically connected to said movable contact member and carrying the circuit current and said electro-magnet being arranged to be magnetized by the current carried by said strip, and means operable upon the unlatching of said movable contact member to move the latter to disengage said contact thereof from said stationary contact.]

3. In a circuit breaker mechanism comprising a movable contact member, manually operable actuating means, and a thermal-current responsive flexible strip bodily carried by and movable with said contact member and operable to latch said actuating means to the contact member and to unlatch the same by deflection of the strip, the combination with said flexible strip of electromagnetic means including a magnetic member mounted on said strip and movable therewith and an armature bodily movable with said contact member and said strip and disposed in spaced relation to said magnetic member, whereby the latter is magnetically attracted to said armature and deflects said strip to unlatch said actuating means when said electro-magnetic means is energized to a predetermined amount, said strip having lateral projections at its opposite edges, respectively, and said magnetic member straddling said strip and having opposed sides provided with openings into which said projections, respectively, extend for mounting said magnetic member on said strip.

4. In a circuit breaker mechanism comprising a movable contact member, manually operable actuating means, and a thermal-current responsive flexible strip bodily carried by and movable with said contact member and operable to latch said actuating means to the contact member and to unlatch the same by deflection of the strip, the combination with said flexible strip of electromagnetic means including a magnetic member mounted on said strip and movable therewith and an armature bodily movable with said contact member and said strip and disposed in spaced relation to said magnetic member, whereby the latter is magnetically attracted to said armature and deflects said strip to unlatch said actuating means when said electro-magnetic means is energized to a predetermined amount, said magnetic member and said armature having confronting parallel surface portions and said magnetic member having a limited movement on said strip relatively thereto to maintain said surface portions in parallel relation during the flexing of said strip.

5. In a circuit breaker mechanism comprising a movable contact member, manually operable actuating means, and a thermal-current responsive flexible strip bodily carried by and movable with said contact member and operable to latch said actuating means to the contact member and to unlatch the same by deflection of the strip, the combination with said flexible strip of electromagnetic means including a magnetic member mounted on said strip and movable therewith and an armature bodily movable with said contact member and said strip and disposed in spaced relation to said magnetic member, whereby the latter is magnetically attracted to said armature and deflects said strip to unlatch said actuating means when said electro-magnetic means is energized to a predetermined amount, said magnetic member and said armature having confronting parallel surface portions and said magnetic member having a limited movement on said strip relatively thereto to maintain said surface portion in parallel relation during the flexing of said strip, said strip having lateral projections at its opposite edges, respectively, and said magnetic member straddling said strip and having opposed sides provided with openings into which said projections, respectively, extend with clearance of the edges of said openings for mounting said magnetic member on said strip in said relatively movable relation thereto.

[6. In a circuit breaker mechanism comprising a movable contact member, manually operable actuating means, and a thermal-current responsive flexible strip bodily carried by and movable with said contact member and operable to latch said actuating means to the contact member and to unlatch the same by deflection of the strip, the combination with said flexible strip of electromagnetic means including a magnetic member mounted on said strip and movable therewith and a rigid armature bodily movable with said movable contact member and said strip and assembled in fixed unitary relation therewith, said armature having a part spaced from said magnetic member in the direction of the magnetic path whereby said magnetic member is magnetically attracted to said armature and moves toward the latter with deflection of said strip upon predetermined energization of said electro-magnetic means.]

[7. In a circuit breaker having relatively movable companion contacts engageable with and disengageable from each other and a flexible bimetallic current-carrying strip, the combination with a movable one of said contacts and with said strip of electro-magnetic means operable in response to the current carried by said strip to flex said strip for effecting relative movement of said contacts said electro-magnetic means comprising a magnetic member positioned in such relation to said current-carrying strip that the latter constitutes the energizing current-conductor of said magnetic member and an armature mounted so that said magnetic member moves toward said armature when a current of predetermined strength flows in said strip, said magnetic member being operatively connected to said strip to flex the latter in response to said movement of the magnetic member toward said armature, said strip and said magnetic member and its armature being all secured together as a unit with said movable one of said relatively movable contacts.]

[8. In a circuit breaker having relatively movable companion contacts engageable with and disengageable from each other and a flexible current-carrying strip, the combination with a movable one of said contacts and with said strip of electromagnetic means operable in response to the current carried by said strip to flex said strip for effecting relative movement of said contacts, said electro-magnetic means comprising a magnetic member positioned in such relation to said current-carrying strip that the latter constitutes the energizing current-conductor of said magnetic member, and an armature mounted so that said magnetic member moves toward said armature when a current of predetermined strength flows in said strip, said magnetic member being operatively connected to said strip to flex the latter in response to said movement of the magnetic member toward said armature, said strip being a bi-metallic thermostat having a thermal-responsive characteristic such that the strip flexes to effect relative movement of said contacts in response to current of a different strength than that required to effect flexing of said strip by said magnetic member, said strip and said magnetic member and its armature being all secured together as a unit with said movable one of said relatively movable contacts.]

*9. In a circuit breaker mechanism comprising a movable contact member, manually operable actuating means, latching means, and a thermal-current responsive flexible strip bodily carried by and movable with said contact member and operable to latch said actuating means to the contact member and to unlatch the same by deflection of the strip, the combination with said flexible strip of electro-magnetic means including a magnetic member mounted on said strip and movable therewith, said flexible thermal-current responsive strip having a part at one side of said magnetic member fixed to said movable contact member in electrical engagement therewith and a part at the other side of said magnetic member engageable with said latching means and electrically connected directly to a current-supply terminal of the circuit breaker, and a rigid armature bodily movable with said movable contact member and said strip and assembled in fixed unitary relation therewith, said armature having a part spaced from said magnetic member in the direction of the magnetic path whereby said magnetic member is magnetically attracted to said armature and moves toward the latter with deflection of said strip upon predetermined energization of said electro-magnetic means.*

*10. In an automatic circuit breaker which comprises a stationary contact, a movable contact member provided with a contact engageable with and disengageable from said stationary contact, manually operable actuating means, and a thermally-responsive bi-metallic strip for effecting disengagement of said contact in response to predetermined current in the circuit, said strip being carried by and bodily movable with said movable contact member and also movable relatively thereto for latching the latter to and unlatching it from said actuating means, said strip having a rectilinear portion, the combination with said movable contact member and said strip of an electro-magnet carried by said strip and a companion armature carried by said movable contact member, said electro-magnet comprising said portion of said strip and a magnetic member mounted directly on and disposed between the opposite ends of said rectilinear portion of the strip, said electro-magnet being movable in relation to said armature in response to predetermined current in the circuit whereby to move said strip to unlatch said movable contact member from said actuating means independently of the response of said strip itself to the current, and means operable upon the unlatching of said movable contact member to move the latter to disengage said contact thereof from said stationary contact.*

*11. In an automatic circuit breaker which comprises a stationary contact, a movable contact member provided with a contact engageable with and disengageable from said stationary contact, manually operable actuating means, and a thermally-responsive bi-metallic strip for effecting disengagement of said contact in response to predetermined current in the circuit, said strip being carried by and bodily movable with said movable contact member and also movable relatively thereto for latching the latter to and unlatching it from said actuating means, the combination with said movable contact member and said strip of an electro-magnet carried by said strip and a companion armature carried by said movable contact member, said electro-magnet being movable in relation to said armature in response to predetermined current in the circuit whereby to move said strip to unlatch said movable contact member from said actuating means independently of the response of said strip itself to the current, said electro-magnet comprising a rectilinear portion of said strip and a magnetic member mounted directly on and disposed between the opposite ends of said rectilinear portion of the strip, said strip being electrically connected to said movable contact member and carrying the circuit current and said electro-magnet being arranged to be magnetized by the current carried by said strip, and means operable upon the unlatching of said movable contact member to move the latter to disengage said contact thereof from said stationary contact.*

*12. In a circuit breaker having relatively movable companion contacts engageable with and disengageable from each other and a flexible rectilinear bi-metallic current-carrying strip, the combination with a movable one of said contacts and with said strip of electro-magnetic means operable in response to the current carried by said strip to flex said strip for effecting relative movement of said contacts, said electro-magnetic means comprising a magnetic member positioned in such relation to said current-carrying strip that the latter constitutes the energizing current-conductor of said magnetic member, and an armature mounted so that said magnetic member moves toward said armature when a current of predetermined strength flows in said strip, said magnetic member being mounted directly on said strip to flex the latter in response to said movement of the magnetic member toward said armature, said strip and said magnetic member and its armature being all secured together as a unit with said movable one of said relatively movable contacts.*

*13. In a circuit breaker having relatively movable companion contacts engageable with and disengageable from each other and a flexible rectilinear current-carrying strip, the combination with a movable one of said contacts and with said strip of electro-magnetic means operable in response to the current carried by said strip to flex said strip for effecting relative movement of said contacts, said electro-magnetic means comprising a magnetic member positioned in such relation to said current-carrying strip that the latter constitutes the energizing current-conductor of said magnetic member, and an armature mounted so that said magnetic member moves toward said armature when a current of predetermined*

*strength flows in said strip, said magnetic member mounted directly on said strip to flex the latter in response to said movement of the magnetic member toward said armature, said strip being a bi-metallic thermostat having a thermal-responsive characteristic such that the strip flexes to effect relative movement of said contacts in response to current of a different strength than that required to effect flexing of said strip by said magnetic member, said strip and said magnetic member and its armature being all secured together as a unit with said movable one of said relatively movable contacts.*

*14. In an automatic circuit breaker which comprises a stationary contact, a movable contact member formed of metal and provided with a contact engageable with and disengageable from said stationary contact, manually operable actuating means, and a thermally-responsive bimetallic strip for effecting disengagement of said contact in response to predetermined current in the circuit, said strip being carried directly by and bodily movable with said movable contact member and also movable relatively thereto for latching the latter to and unlatching it from said actuating means, the combination with said movable contact member and said strip of an electromagnet carried by said strip and a companion*

*armature carried directly by said movable contact member, said electro-magnet being movable in relation to said armature in response to predetermined current in the circuit whereby to move said strip to unlatch said movable contact member from said actuating means independently of the response of said strip itself to the current, and means operable upon the unlatching of said movable contact member to move the latter to disengage said contact thereof from said stationary contact.*

HAROLD ALBERT HUMPAGE.

REFERENCES CITED

The following references are of record in the file of this patent or the original patent:

UNITED STATES PATENTS

| Number | Name | Date |
|---|---|---|
| 1,812,845 | Sachs | June 30, 1931 |
| 2,027,238 | Lindstrom | Jan. 7, 1936 |
| 2,035,743 | Frank | Mar. 31, 1936 |
| 2,209,319 | Christensen | July 30, 1940 |
| 2,209,352 | Sachs et al. | July 30, 1940 |
| 2,325,717 | Swingle | Aug. 3, 1943 |
| 2,352,517 | Christensen | June 27, 1944 |
| 2,424,909 | Adam et al. | July 29, 1947 |